United States Patent
Billeter et al.

[11] 3,939,406
[45] Feb. 17, 1976

[54] MICROWAVE FLUID FLOW METER

[75] Inventors: Thomas R. Billeter; Lee D. Philipp, both of Richland, Wash.; Richard R. Schemmel, Lynchburg, Va.

[73] Assignee: Westinghouse Electric Corporation, Pittsburgh, Pa.

[22] Filed: June 13, 1973

[21] Appl. No.: 369,664

[52] U.S. Cl. .............. 324/58.5 C; 73/55; 73/194 E; 73/211; 73/398 R
[51] Int. Cl. ........................................... G01r 27/04
[58] Field of Search ................ 324/58.5 C, 58 C; 73/194 E, 55, 211, 398 R

[56] References Cited
UNITED STATES PATENTS

| | | | |
|---|---|---|---|
| 1,673,674 | 6/1928 | Goetz | 73/211 |
| 2,494,570 | 1/1950 | Mezger | 324/58.5 C |
| 3,124,956 | 3/1964 | Stohldrier | 73/211 |
| 3,161,060 | 12/1964 | Kemmer | 73/398 R |
| 3,327,522 | 6/1967 | Hoyt | 73/55 |
| 3,548,638 | 12/1970 | Uchida et al. | 73/55 |
| 3,688,188 | 8/1972 | Bak et al. | 324/58.5 C |

FOREIGN PATENTS OR APPLICATIONS

| | | | |
|---|---|---|---|
| 1,173,438 | 12/1969 | United Kingdom | 324/58.5 C |
| 1,197,699 | 7/1970 | United Kingdom | 324/58.5 C |

*Primary Examiner*—Stanley T. Krawczewicz
*Attorney, Agent, or Firm*—D. C. Abeles

[57] ABSTRACT

A microwave fluid flow meter is described utilizing two spaced microwave sensors positioned along a fluid flow path. Each sensor includes a microwave cavity having a frequency of resonance dependent upon the static pressure of the fluid at the sensor locations. The resonant response of each cavity with respect to a variation in pressure of the monitored fluid is represented by a corresponding electrical output which can be calibrated into a direct pressure reading. The pressure drop between sensor locations is then correlated as a measure of fluid velocity.

In the preferred embodiment the individual sensor cavities are strategically positioned outside the path of fluid flow and are designed to resonate in two distinct frequency modes yielding a measure of temperature as well as pressure. The temperature response can then be used in correcting for pressure responses of the microwave cavity encountered due to temperature fluctuations.

5 Claims, 2 Drawing Figures

MICROWAVE FLUID FLOW METER

BACKGROUND OF THE INVENTION

The invention described herein was made in the course of, or under, a contract with the U.S. Atomic Energy Commission and pertains generally to fluid flow meters and more particularly to such meters that employ microwave measuring techniques.

The advent of the fast breeder reactor employing liquid metal technology has generated a need for apparatus capable of determining the sodium flow rate encountered through the individual fuel subassemblies, process channels and closed loop test assemblies. Design limitations require such sensors to operate in a very limited space under severe environmental conditions of temperature, pressure and radiation levels. When necessary, installation, removal or replacement of the sensor must be achieved with a minimum of effort and time.

State-of-the-art flow sensors presently available are unable to meet the aforedescribed specifications. In fact, presently proposed sensors partially obstruct flow of the fluid during the measurement process. This obstruction causes turbulent flow, a pressure drop due to the flow meters, and even a possible coolant blockage if failures occur.

A critical need exists for better methods of coolant flow detection in all nuclear reactors. A flow restriction through one or more fuel channels in the core can result in a failure or melting of the fuel. To monitor for such occurrences, flow or coolant temperature detection equipment have been used in the past. Temperature detection methods are limited because of the corresponding time lag between blockage and increased coolant temperature. Flow monitors are ideal since they detect immediately any change in flow. Immediate detection is vital if one ever hopes to avert fuel melting or at least minimize fuel damage. Unfortunately, reliable and accurate flow meters are not a common feature in reactors today. Many of the problems occur because of the requirement for several, usually mechanical, devices prone to frequent failure as well as numerous instrumentation leads and connectors, also prone to failure.

Accordingly, apparatus is desired having the capability of providing such measurements without disturbing the flow monitored. Additionally, such sensors must exhibit the ability to maintain a high degree of sensitivity and stability under severe environmental conditions as well as provide a fast response time as required in liquid metal applications.

SUMMARY OF THE INVENTION

Briefly, this invention employs a plurality of spaced microwave sensors positioned along a fluid flow path to provide a measurement of fluid velocity. The individual sensors include a microwave cavity having a resonant frequency response dependent upon the static pressure of the fluid monitored. The respective cavity resonant frequencies are translated into representative electrical outputs calibrated into a pressure response. The pressure drop between sensors is then interpreted as a measure of the fluid's velocity between monitoring locations.

The sensor microwave cavity can be designed to resonate in two distinct frequency modes having a specific dependence on the fluid parameters that will yield a measure of temperature as well as pressure. The temperature response can then be employed in correcting for temperature dependent pressure responses of the microwave cavity.

In the preferred embodiment the sensors are positioned outside the fluid path to avoid flow obstructions.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

The apparatus of this invention utilizes a pair of spaced microwave sensors positioned along a fluid flow path to measure the fluid's velocity. The preferred embodiment to follow is illustrated an extremely adverse fast breeder reactor environment which particularly points out the versatility and specific benefits provided by the inventive concepts presented.

Figure 1:
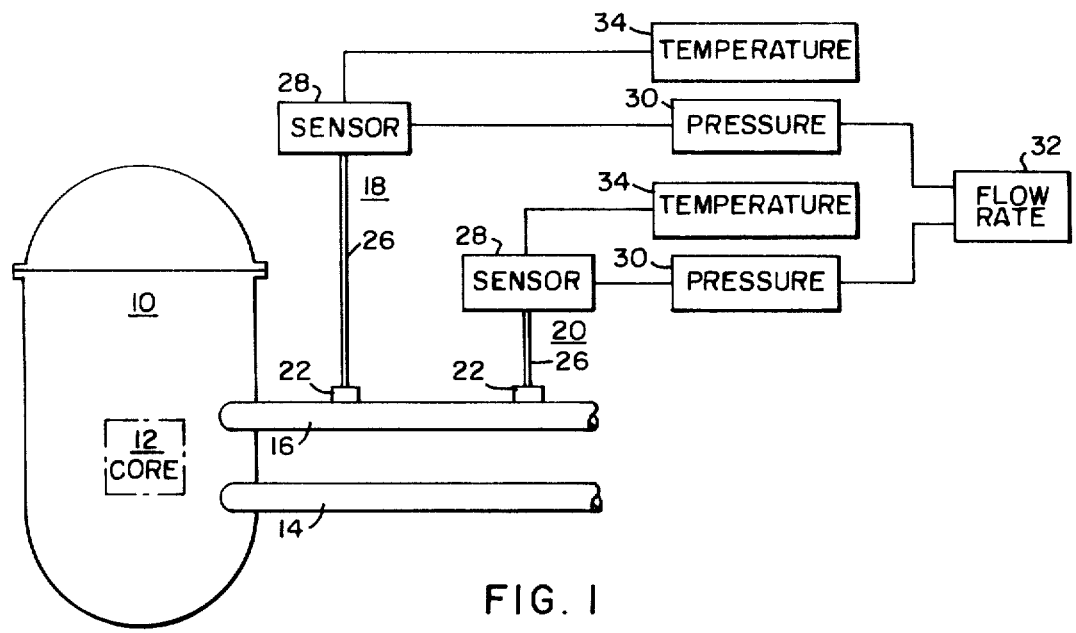
FIG. 1 is a schematic diagram of an exemplary flow rate metering system contemplated by this invention shown in a fast breeder reactor environment monitoring one of the external coolant loops.

A liquid metal fast breeder reactor vessel and head enclosure 10 are illustrated in FIG. 1 having a heat generative core 12 and coolant flow inlet and outlet means 14 and 16 formed integral with and through the vessel walls. The coolant flow outlet pipe 16, commonly called the hot-leg of the primary loop of the reactor, conducts the heated coolant to intermediate heat exchange means, not shown, commonly employed to create steam which is used to drive apparatus designed for the production of electricity. The cooled coolant exiting the heat exchanger is returned through cool-leg conduit 14 to the core region of the reactor for recirculation. The sensors of this invention, 18 and 20, are illustrated positioned at two-spaced locations along the hot-leg of the coolant piping 16 to monitor the static pressure of the fluid sodium at the two sensor locations. The corresponding pressure measurements obtained are then compared to give an indication of the fluid coolant flow rate within the conduit 16.

In its preferred form the sensors 18 and 20 respectively include individual metal cavities 22 of particular internal dimensions designed to resonate at microwave frequencies. The specific design of the cavities, as well as the sensor waveguide assembly 26 is illustrated is more detail in FIG. 2. Of importance to this embodiment, there are specific values of $(2a/L)^2$ for a cylindrical cavity (where $a$ = the inside radius and $L$ = the side length of the cylinder) for which the cavity resonates in two distinct (degenerate) modes collectively dependent upon both pressure and temperature for the same exciting frequency. Simultaneous and independent excitation and detection of these modes can be achieved, as fully described in copending application Ser. No. 328,220, filed Jan. 31, 1973, to allow simultaneous detection of both pressure and temperature.

Figure 2:
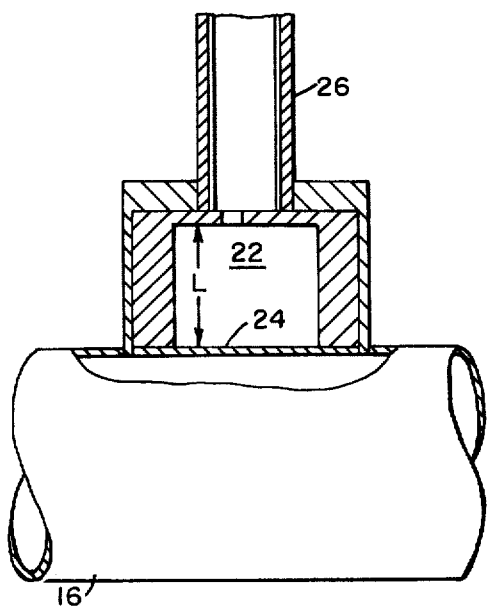
FIG. 2 is a sectional view of the dual property sensor and waveguide assembly employed in FIG. 1.

The embodiment illustrated in FIG. 2 shows the resonant cavity 22 as having a flexible end wall 24 formed as an integral part of the piping wall 16. A change in pressure within the piping will result in a displacement of the end wall 24, effectively changing the longitudinal dimension L of the cavity and thus altering the resonant frequency of the pressure dependent mode. The resonant energy is communicated to the processing electronics 28 shown in block form coupled to the waveguide 26 in FIG. 1. The electronics function to convert the microwave energy to a corresponding electrical output representative of the monitored coolant's pressure as indicated by block 30. The pressure responses obtained in monitoring the sensor locations are then compared and analyzed, as schematically shown by block 32, to obtain a measurement of the flow rate of the fluid within the conduit 16. A separate temperature measurement 34 can be obtained, as explained in the aforecited reference, from the corresponding response of the temperature dependent mode to provide a correction for temperature responsive pressure readings of the cavity. A more detailed understanding of the specific apparatus employed can be had from the aforecited reference and a comparison of pressure responses can be obtained by a simple implementation of differential amplifier circuitry presently within the state of the art.

After the pressure responses are obtained they are correlated using a mathematical relationship relating the pressure drop between sensors to the fluid flow rate as illustrated by the following example.

Assuming a 4 inch diameter pipe or tube containing flowing liquid sodium at 700°F, the Reynolds number for different velocities of flow can be calculated from the relationship:

$$R = \frac{\text{Velocity } (V, \text{ft/sec}) \times \text{Diameter } (D, \text{ft})}{\text{viscosity } (v, \text{ft}^2/\text{sec})}$$

For velocities of 10 feet/second, 15 feet/second, and 20 feet/second, the corresponding Reynolds numbers calculated are $R_{10} = 9.6 \times 10^5$; $R_{15} = 14.4 \times 10^5$, and $R_{20} = 19.2 \times 10^5$. Given a relative roughness for a standard commercial pipe of $\epsilon/D$ of 0.0004, a Moody diagram determines the friction factor to be $f_{10} = 0.0164$, $f_{15} = 0.0162$, and $f_{20} = 0.0161$ for the above velocities, respectively.

The pressure drop along the pipe can be related to velocity using the relationship:

$$\Delta p = \frac{\rho f v^2 L}{144 D 2g}$$

where:
$\rho$ = density
$f$ = friction factor
$L$ = the spacing between sensors
$g$ = the force of gravity.

Again, assuming a fluid of liquid sodium at 700°F, and with the pressure sensors along the pipe spaced 10 feet apart, the calculated pressure drop for different velocities of flow are illustrated by the following table.

| Velocity | Pressure Drop | For 10% Change in Flow Rates |
|---|---|---|
| 6 ft/sec | 0.11 psi | |
| 10 ft/sec | 0.29 psi | 0.06 psi |
| 11 ft/sec | 0.35 psi | |
| 15 ft/sec | 0.64 psi | 0.13 psi |
| 16.5 ft/sec | 0.77 psi | |
| 20 ft/sec | 1.12 psi | 0.24 psi |
| 22 ft/sec | 1.36 psi | |

Thus, detection sensitivity, depending upon the allowed spacing between sensors, will be greater at higher velocities. For sensors spaced 10 feet apart, pressure resolution will be approached at the lower limit of 6 feet/second, which is within the design specifications for liquid metal fast breeder reactors. The above calculations prove that the apparatus of this invention will readily be applicable to monitoring the flow at the core sodium inlet and outlet locations. Alternate applications to the individual subassemblies comprising the core appear similarly feasible. Tables compiled in the same manner as that presented above can form a basis for calibrating the readout electronics according to the pressure drop between sensors to provide a direct readout of the flow rate as indicated by reference character 32.

Thus, while the embodiment illustrated as being exemplary of this invention has been shown positioned external to the coolant loop piping of the reactor with the sensor cavity having one wall formed integral with the pipe walls to avoid obstructions to the fluid flow, it should be understood that the sensors can be positioned at any desired location along the fluid flow path, either internal or external to the reactor vessel. For example, in monitoring for coolant flow blockage within the core it is desirable to position the sensors directly along the path of flow within the fuel assemblies, so that an immediate response can be obtained and acted upon to limit damage to the fuel.

Accordingly, a liquid flow rate monitor has been described which in its preferred form will yield output signals proportional to both temperature and static pressure, and therefore can be employed to sense those fluid physical properties as well as flow. Inasmuch as two sensors are employed to measure three parameters, flow rate, pressure and temperature, additional reliability is achieved in obtaining the added parameter responses. Calibration and operational conditions of the pressure sensors when immersed in the monitored fluid can be ascertained simply by providing appropriate valving and specific reference gas pressures as taught in the aforecited reference.

Furthermore, experimental results have verified the indicated pressure resolution and time responses for given pressure variations, and the sensors have been shown to be applicable to the severe environments encountered in a fast breeder application. Of particular significance, the upper operational temperature limit for the sensor exceeds the 1200°F requirement for this specific application, while the sensor remains insensitive to thermal instability and thermal drift when the simultaneous temperature response is employed for compensation. The few components necessary for sensor fabrication (cavity, diaphragm and waveguide) will simplify instrumentation, while component material choices will insure provision of a sensor relatively insensitive to decalibrations due to the severe environment. Finally, the pressure sensors can be placed outside the path of flow, reducing turbulence which might otherwise contribute to inaccurate static pressure readings as well as affect fluid performance within the monitored system.

We claim as our invention:
1. Apparatus for measuring the rate of liquid flow within a fluid conduit comprising:
 a first microwave sensor having a resonant micro- wave cavity directly responsive to the fluid pressure internal of the conduit to provide a representative electrical output indicative thereof, said microwave cavity being exposed to the interior of the fluid conduit at a first given fixed location therealong outside the path of fluid flow;

a second microwave sensor having a second resonant microwave cavity directly responsive to the fluid pressure internal of the conduit to provide a representative electrical output indicative thereof, said second microwave cavity being exposed to the interior of the fluid conduit at a second given fixed location therealong outside the path of fluid flow and spaced from said first location; and means for comparing the respective outputs from said first and second sensors and responsive thereto to provide a measurement of fluid flow within the conduit.

2. The apparatus of claim 1 wherein said first and second microwave cavities are respectively formed, in part, integral with the wall of the fluid conduit.

3. The apparatus of claim 2 wherein at least a portion of the fluid conduit wall at said first and second locations respectively form at least a section of one wall of said corresponding first and second microwave cavities, the remaining walls of said first and second cavities being maintained exterior of the fluid conduit.

4. The apparatus of claim 2 wherein corresponding portions of the conduit wall common to said first and second microwave cavities are constructed in a manner to change one geometric dimension of said first and second cavities in response to a pressure gradient across said common wall portions.

5. The apparatus of claim 1 wherein said first and second cavities respectively comprise a single hollow member having a wall section responsive to pressure to move in a manner to change the effective dimension of the hollow member along a prescribed axis, said first and second cavities being designed to resonate at two resonant frequency modes respectively dependent upon a unique combination or permutation of and collectively dependent on both the temperature and pressure of the fluid measured, and wherein said first and second sensors are responsive to the two resonant modes of said corresponding first and second cavities to provide electrical outputs indicative of both pressure and temperature so that the respective pressure measurements can be compensated for variations in the corresponding cavity temperatures.

* * * * *